US012748416B2

(12) United States Patent
Toshihiro et al.

(10) Patent No.: US 12,748,416 B2
(45) Date of Patent: Sep. 29, 2026

(54) DATA PROCESSING SYSTEM AND DATA PROCESSING METHOD

(71) Applicant: Panasonic Intellectual Property Management Co., Ltd., Osaka (JP)

(72) Inventors: Shunsaku Toshihiro, Osaka (JP); Yusuke Kuboi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 418 days.

(21) Appl. No.: 18/555,111

(22) PCT Filed: Mar. 15, 2022

(86) PCT No.: PCT/JP2022/011482
§ 371 (c)(1),
(2) Date: Oct. 12, 2023

(87) PCT Pub. No.: WO2022/224633
PCT Pub. Date: Oct. 27, 2022

(65) Prior Publication Data

US 2024/0201681 A1 Jun. 20, 2024

(30) Foreign Application Priority Data

Apr. 20, 2021 (JP) ................................. 2021-071363

(51) Int. Cl.
*G05B 23/02* (2006.01)

(52) U.S. Cl.
CPC ..... *G05B 23/0272* (2013.01); *G05B 23/0275* (2013.01)

(58) Field of Classification Search
CPC ............ G05B 23/0272; G05B 23/0275; G05B 23/0235; G05B 19/042
See application file for complete search history.

(56) References Cited

U.S. PATENT DOCUMENTS

2014/0201571 A1* 7/2014 Hosek .................... B25J 9/1674 714/26
2018/0232294 A1 8/2018 Oyama et al.
(Continued)

FOREIGN PATENT DOCUMENTS

CN 111258303 A 6/2020
JP 2020-160528 10/2020

OTHER PUBLICATIONS

Xiao et al., "Performance Analysis of Vibration Sensors for Closed-Loop Feedback Health Monitoring of Mechanical Equipment", Oct. 26, 2021, Journal of Sensors, vol. 201, Article ID 6348347, pp. 1-12 (Year: 2021).*

(Continued)

*Primary Examiner* — Mi'schita' Henson
(74) *Attorney, Agent, or Firm* — Rimon P.C.

(57) ABSTRACT

Misleading is less likely to be caused in deterioration diagnosis of servo system. A data processing system includes acquisition part, first generator, second generator, and presentation part. Acquisition part acquires at least one of a control signal of servo system and a detection signal from sensor. First generator generates pieces of first data regarding three or more feature values from a predetermined region in a signal waveform. Second generator generates three or more pieces of second data indicating change tendencies with time of the pieces of first data regarding the three or more feature values. Presentation part compares the three or more pieces of second data with each other, and presents specific second data exhibiting a different change tendency by performing specific processing related to object data that is the first data that causes the different change tendency in a case where there is the specific second data.

10 Claims, 5 Drawing Sheets

(56) References Cited

U.S. PATENT DOCUMENTS

| | | | | |
|---|---|---|---|---|
| 2018/0314228 | A1 | 11/2018 | Shinoda et al. | |
| 2018/0314243 | A1* | 11/2018 | Fujita | G05B 13/0265 |

OTHER PUBLICATIONS

International Search Report of PCT application No. PCT/JP2022/011482 dated May 31, 2022.

The EPC Office Action dated Aug. 23, 2024 for the related European Patent Application No. 22791413.2.

English Translation of Chinese Search Report dated Mar. 16, 2026 for the related Chinese Patent Application No. 202280029343.3.

* cited by examiner

DATA PROCESSING SYSTEM AND DATA PROCESSING METHOD

CROSS-REFERENCE TO RELATED APPLICATIONS

This application is a U.S. national stage application of the PCT International Application No. PCT/JP2022/011482 filed on Mar. 15, 2022, which claims the benefit of foreign priority of Japanese patent application No. 2021-071363 filed on Apr. 20, 2021, the contents all of which are incorporated herein by reference.

TECHNICAL FIELD

The present disclosure generally relates to a data processing system, a data processing method, and a program. More specifically, the present disclosure relates to a data processing system, a data processing method, and a program used for deterioration diagnosis of a servo system.

BACKGROUND ART

A deterioration estimation device described in PTL 1 includes an inspection result acquisition part, an attribute data acquisition part, and an estimation part. The inspection result acquisition part acquires an inspection result of a facility as a maintenance target. The attribute data acquisition part acquires attribute data of the facility as the maintenance target. The estimation part estimates a deterioration rank of the facility as the maintenance target by using, as inputs, the inspection result and the attribute data of the facility as the maintenance target.

CITATION LIST

Patent Literature

PTL 1: Unexamined Japanese Patent Publication No. 2020-160528

SUMMARY OF THE INVENTION

Incidentally, information regarding deterioration diagnosis may show a temporary irregular tendency due to the influence of noise or the like. There is a possibility that presentation of such information causes a user to misunderstand (misleading).

The present disclosure has been made in view of the above circumstances, and an object of the present disclosure is to provide a data processing system, a data processing method, and a program that make it difficult to cause misleading in deterioration diagnosis.

A data processing system according to an aspect of the present disclosure is used for deterioration diagnosis of an object of at least one of a load and a servomotor in a servo system including the load, a servo amplifier, and the servomotor that applies power to the load in accordance with control of the servo amplifier. The data processing system includes an acquisition part, a first generator, a second generator, and a presentation part. The acquisition part acquires at least one of a control signal used for controlling the servo system and a detection signal output from a sensor that detects a state of the servo system. The first generator generates pieces of first data regarding three or more feature values from a predetermined region in a signal waveform of the at least one signal. The second generator generates three or more pieces of second data that are pieces of time-series data indicating progress of deterioration of the object, and the three or more pieces of second data indicate change tendencies with time of the pieces of first data regarding the three or more feature values, respectively. The presentation part compares the three or more pieces of second data with each other. The presentation part presents specific second data exhibiting a change tendency different from the change tendencies of the other pieces of second data by performing specific processing related to object data that is the first data that causes the different change tendency in a case where there is the specific second data. The specific processing includes processing related to at least one of non-presentation of the object data, correction of the object data, and notification related to the object data.

A data processing method according to another aspect of the present disclosure relates to deterioration diagnosis of an object of at least one of a load and a servomotor in a servo system including the load, a servo amplifier, and the servomotor that applies power to the load in accordance with control of the servo amplifier. The data processing method includes an acquisition step, a first generation step, a second generation step, and a presentation step. In the acquisition step, at least one of a control signal used for controlling the servo system and a detection signal output from a sensor that detects a state of the servo system is acquired. In the first generation step, pieces of first data regarding three or more feature values are generated from a predetermined region in a signal waveform of the at least one signal. In the second generation step, three or more pieces of second data that are pieces of time-series data indicating progress of deterioration of the object are generated, and the three or more pieces of second data indicate change tendencies with time of the pieces of first data regarding the three or more feature values, respectively. In the presentation step, the three or more pieces of second data are compared with each other. In the presentation step, specific second data exhibiting a change tendency different from the change tendencies of the other pieces of second data is presented by performing specific processing related to object data that is the first data that causes the different change tendency in a case where there is the specific second data. The specific processing includes processing related to at least one of non-presentation of the object data, correction of the object data, and notification related to the object data.

A program according to still one aspect of the present disclosure is a program for causing one or more processors to execute the data processing method described above.

According to the present disclosure, there is an advantage that misleading is less likely to be caused in deterioration diagnosis.

DESCRIPTION OF EMBODIMENT (Outline)

Hereinafter, a data processing system, a data processing method, and a program according to an exemplary embodiment will be described with reference to the drawings. Incidentally, the following exemplary embodiment is merely one of various exemplary embodiments of the present disclosure. The following exemplary embodiment can be changed variously in accordance with a design and the like, as long as an object of the present disclosure can be achieved.

(Feature 1)

Figure 1:
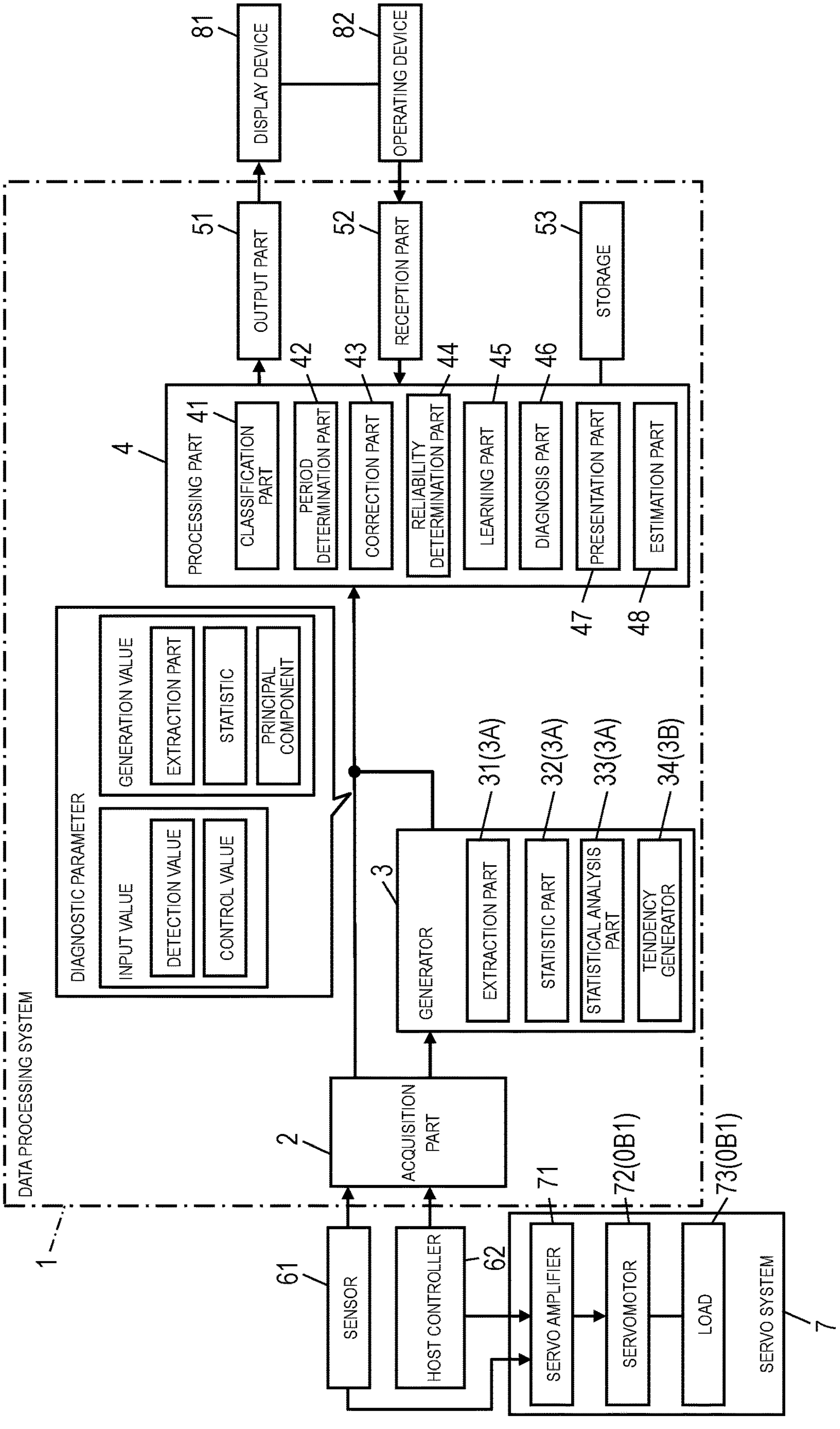
FIG. 1 is a schematic block configuration diagram of an entire system including a data processing system according to an exemplary embodiment.

FIG. 1 is a schematic block configuration diagram of an entire system including data processing system 1 according to the exemplary embodiment. As illustrated in FIG. 1, data processing system 1 according to one aspect includes acquisition part 2 and generator 3. Acquisition part 2 acquires, as input values, at least one of a control value and a detection value. The control value is used for controlling servo system 7 including load 73, servo amplifier 71, and servomotor 72 that applies power to load 73 in accordance with the control of servo amplifier 71. The detection value is output from sensor 61 that detects a state of servo system 7. Generator 3 generates a diagnostic parameter by performing at least extraction processing on the input value acquired by acquisition part 2. The diagnostic parameter is used for deterioration diagnosis of object OB1 of at least one of load 73 and servomotor 72 in servo system 7. The input values are values that vary with time. In the extraction processing, generator 3 extracts, as the diagnostic parameter, a value of a partial period among the input values.

According to data processing system 1 described above, in the deterioration diagnosis, the values of the periods extracted by generator 3 among the input values can be used. As described above, features that may interfere with the deterioration diagnosis among the input values are removed, and thus, it is possible to improve accuracy of the deterioration diagnosis as compared with a case where the values of all the periods of the input values are used for the deterioration diagnosis.

A data processing method according to one aspect includes an acquisition step and a generation step. In the acquisition step, at least one of the control value and the detection value is acquired as the input values. The control value is used for controlling servo system 7 including load 73, servo amplifier 71, and servomotor 72 that applies power to load 73 in accordance with the control of servo amplifier 71. The detection value is output from sensor 61 that detects a state of servo system 7. In the generation step, the diagnostic parameter is generated by performing at least extraction processing on the input value acquired in the acquisition step. The diagnostic parameter is used for deterioration diagnosis of object OB1 of at least one of load 73 and servomotor 72 in servo system 7. The input values are values that vary with time. In the generation step, in the extraction processing, the value of the partial period among the input values is extracted as the diagnostic parameter.

This data processing method is used on a computer system (data processing system 1). That is, this data processing method can also be embodied by a program. A program according to one aspect is a program for causing one or more processors to execute the data processing method described above. The program may be recorded in a non-transitory computer-readable recording medium.

(Feature 2)

In addition, as illustrated in FIG. 1, data processing system 1 according to one aspect is used for deterioration diagnosis of object OB1 of at least one of load 73 and servomotor 72 in servo system 7. Servo system 7 includes load 73, servo amplifier 71, and servomotor 72 that applies power to load 73 in accordance with the control of servo amplifier 71. Hereinafter, as an example, object OB1 is load 73 and data processing system 1 is used for deterioration diagnosis of load 73. However, object OB1 may be servomotor 72 or may be both load 73 and servomotor 72. Load 73 mentioned here is not particularly limited, and is, for example, a ball screw, a gear, a belt, or the like. Servo system 7 is used, for example, for executing a predetermined work in a manufacturing process of a product (or semi-product).

As illustrated in FIG. 1, data processing system 1 includes acquisition part 2, first generator 3A, second generator 3B, and presentation part 47.

Acquisition part 2 acquires at least one signal of a control signal used for controlling servo system 7 and a detection signal output from sensor 61 that detects the state of servo system 7.

Figure 4A:
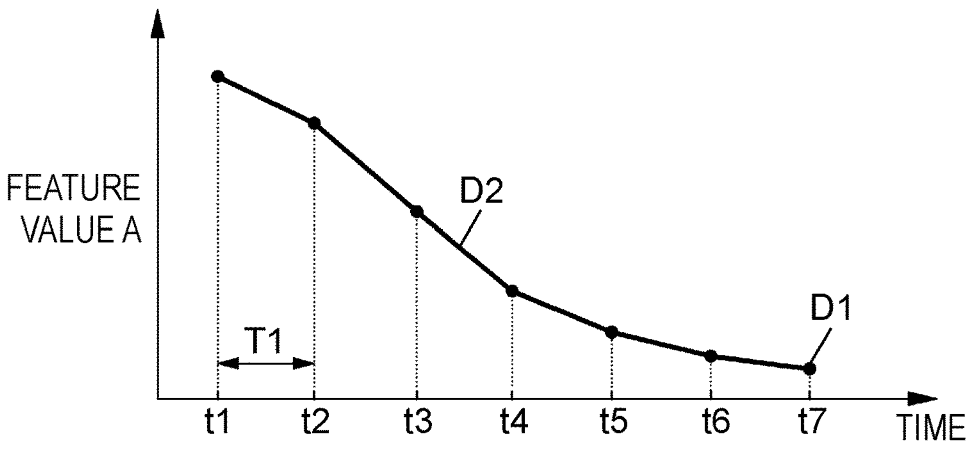
FIG. 4A is a graph for describing first data regarding feature value A in the data processing system.
Figure 4B:
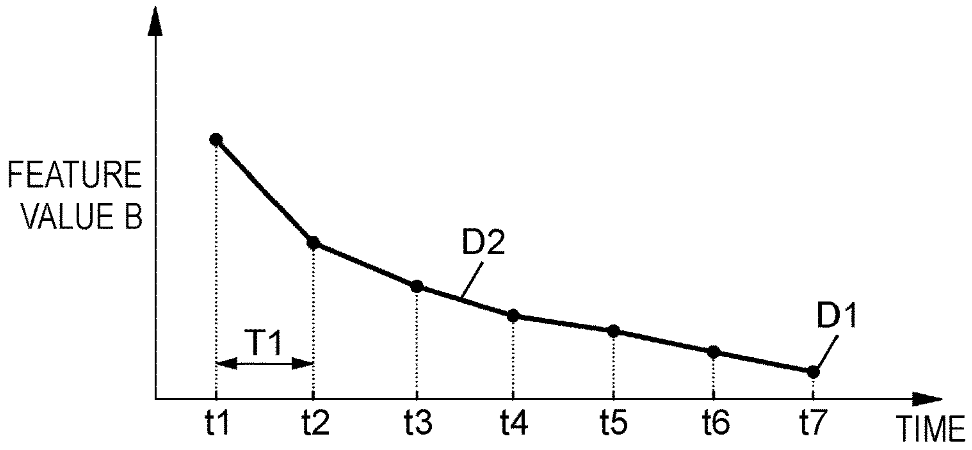
FIG. 4B is a graph for describing first data regarding feature value B in the data processing system.
Figure 4C:
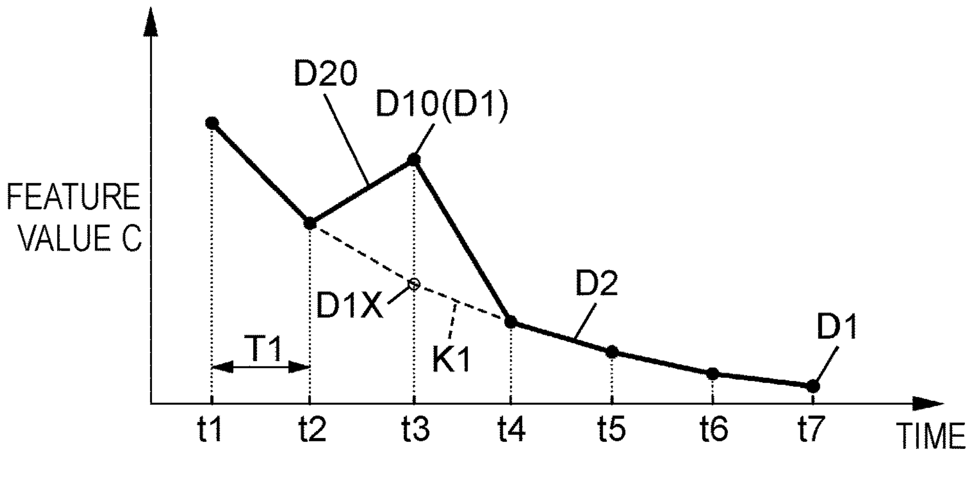
FIG. 4C is a graph for describing first data regarding feature value C in the data processing system.

FIGS. 4A, 4B, and 4C are graphs for describing pieces of first data D1 and pieces of second data D2 regarding feature value A, feature value B, and feature value C, respectively, in data processing system 1. First generator 3A generates pieces of first data D1 (see FIGS. 4A to 4C) regarding three or more feature values from a predetermined region (entire or a part of feature period in which a predetermined feature appears) in a signal waveform of at least one signal. The "feature value" mentioned here is assumed to be, for example, a statistical feature value, and is specifically an average (value), a standard deviation (value), a maximum (value), a minimum (value), a histogram feature, or the like in the predetermined region. Alternatively, the "feature value" may be a first principal component by so-called "principal component analysis". The "three or more feature values" may be feature values of the same type or may be feature values of different types. For example, in a case where first generator 3A generates pieces of first data D1 regarding three feature values from a predetermined region in one signal waveform (signal waveform of a current), the "three feature values" may be an average, a standard deviation, and a maximum, respectively. On the other hand, for example, in a case where first generator 3A generates pieces of first data D1 regarding three feature values from predetermined regions in three signal waveforms (for example, signal waveforms of a current, a torque, and a speed), respectively, all the "three feature values" may be, for example, an average. Hereinafter, as an example, first generator 3A generates pieces of first data D1 regarding three feature values from predetermined regions in three signal waveforms. In FIGS. 4A to 4C, pieces of first data D1 are illustrated as plots.

Second generator 3B generates three or more pieces of second data D2 (see FIGS. 4A to 4C) that are pieces of time-series data indicating the progress of deterioration of object OB1 and indicate change tendencies with time of pieces of first data D1 regarding three or more feature values. In FIGS. 4A to 4C, each piece of second data D2 is illustrated as polygonal line data connecting a plurality of pieces of first data D1 (plots) arranged in time series.

Presentation part 47 compares three or more pieces of second data D2 with each other. In a case where there is specific second data D20 (see FIG. 4C) exhibiting a different change tendency from another second data D2, presentation part 47 performs specific processing related to object data D10 that is first data D1 that causes the different change tendency, and presents specific second data D20. The specific processing includes processing related to at least one of non-presentation of object data D10, correction of object data D10, and notification related to object data D10. For example, in a case where the change tendencies of pieces of second data D2 of more than half of three or more pieces of second data D2 indicate a monotonous decrease while there is less than half (for example, one) of pieces of second data D2 exhibiting a change tendency not corresponding to the monotonous decrease, latter second data D2 corresponds to specific second data D20. In the example of FIG. 4C, there is a section (from point in time t2 to point in time t3) in which specific second data D20 temporarily indicates an increasing tendency, and it can be determined that first data D1 at point in time t3 is object data D10 that causes the different change tendency.

According to data processing system 1 described above, in a case where there is specific second data D20 exhibiting the different change tendency, specific second data D20 is presented by performing the specific processing related to object data D10 that causes the different change tendency. Thus, a user hardly misunderstands object data D10 having a high possibility of being generated by the influence of noise or the like as true data. As a result, data processing system 1 has an advantage that misleading is less likely to be caused in the deterioration diagnosis.

In addition, a data processing method according to one aspect relates to the deterioration diagnosis of object OB1 described above. The data processing method includes an acquisition step, a first generation step, a second generation step, and a presentation step. In the acquisition step, at least one signal of the control signal used for controlling servo system 7 and the detection signal output from sensor 61 that detects the state of servo system 7 is acquired. In the first generation step, pieces of first data D1 regarding three or more feature values are generated from a predetermined region in a signal waveform of at least one signal. In the second generation step, three or more pieces of second data D2 that are pieces of time-series data indicating the progress of deterioration of object OB1 and each indicate change tendencies with time of pieces of first data D1 regarding three or more feature values are generated. In the presentation step, three or more pieces of second data D2 are compared with each other. In the presentation step, in a case where there is specific second data D20 exhibiting the change tendency different from another second data D2, the specific processing related to object data D10 that is first data D1 that causes the different change tendency is performed to present specific second data D20. The specific processing includes processing related to at least one of non-presentation of object data D10, correction of object data D10, and notification related to object data D10. According to the data processing method described above, there is an advantage that misleading is less likely to be caused in the deterioration diagnosis. This data processing method is used on a computer system (data processing system 1). That is, this data processing method can also be embodied by a program. A program according to one aspect is a program for causing one or more processors to execute the data processing method described above. The program may be recorded in a non-transitory computer-readable recording medium.

(Feature 3)

In addition, data processing system 1 according to one aspect is a data processing system 1 that outputs a diagnostic parameter. The diagnostic parameter is used for deterioration diagnosis of object OB1 of at least one of load 73 and servomotor 72 in servo system 7 including load 73, servo amplifier 71, and servomotor 72 that applies power to load 73 in accordance with the control of servo amplifier 71. The diagnostic parameter includes at least one of a control value used for controlling servo system 7, a detection value output from sensor 61 that detects the state of servo system 7, and a generation value generated from the control value or the detection value. Data processing system 1 includes acquisition part 2, reliability determination part 44, and reliability output part (output part 51). Acquisition part 2 acquires the diagnostic parameter. Reliability determination part 44 gives, to the diagnostic parameter, information regarding the reliability of the diagnostic parameter in the deterioration diagnosis of servo system 7. The reliability output part outputs the information regarding the reliability to a presentation device (display device 81) in association with the diagnostic parameter.

According to data processing system 1 described above, the user can determine whether or not a specific diagnostic parameter can be used for the deterioration diagnosis by referring to the reliability presented to the presentation device. Accordingly, convenience for the user is enhanced.

A data processing method according to one aspect is a data processing method for outputting a diagnostic parameter. The diagnostic parameter is used for deterioration diagnosis of object OB1 of at least one of load 73 and servomotor 72 in servo system 7 including load 73, servo amplifier 71, and servomotor 72 that applies power to load 73 in accordance with the control of servo amplifier 71. The diagnostic parameter includes at least one of a control value used for controlling servo system 7, a detection value output from sensor 61 that detects the state of servo system 7, and a generation value generated from the control value or the detection value. The data processing method includes an acquisition step, a reliability determining step, and a reliability output step. In the acquisition step, the diagnostic parameter is acquired. In the reliability determination step, the information regarding the reliability of the diagnostic parameter in the deterioration diagnosis of servo system 7 is given to the diagnostic parameter. In the reliability output step, the information regarding the reliability is output to the presentation device (display device 81) in association with the diagnostic parameter.

This data processing method is used on a computer system (data processing system 1). That is, this data processing method can also be embodied by a program. A program according to one aspect is a program for causing one or more processors to execute the data processing method described above. The program may be recorded in a non-transitory computer-readable recording medium.

(Details)

(1) Overall Configuration

As illustrated in FIG. 1, data processing system 1 is used together with sensor 61, host controller 62, servo system 7, display device 81, and operating device 82.

Data processing system 1 performs deterioration diagnosis of servo system 7 by using information acquired from at least one of sensor 61 and host controller 62. Display device 81 displays a diagnosis result. In addition, the user of data processing system 1 can perform settings related to the deterioration diagnosis by operating operating device 82. The settings are appropriately performed, and thus, the accuracy of the deterioration diagnosis can be improved.

Data processing system 1 is provided, for example, at a place away from a facility (for example, a factory) where servo system 7 is installed. Sensor 61, host controller 62, display device 81, and operating device 82 are installed, for example, in a facility where servo system 7 is installed. Sensor 61, host controller 62, display device 81, and operating device 82 communicate with data processing system 1 via a wide area network such as the Internet.

(2) Servo System

Servo system 7 includes servo amplifier 71, servomotor 72, and load 73. Data processing system 1 is used for deterioration diagnosis of object OB1 of at least one (here, load 73) of load 73 and servomotor 72. Servomotor 72 may be a linear motor or may be a rotary motor. In the present exemplary embodiment, a case where servomotor 72 is a rotary motor will be described as an example.

Servomotor 72 has an output shaft, and rotates the output shaft under the control of servo amplifier 71. Load 73 is connected to the output shaft of servomotor 72. Load 73 is powered by servomotor 72. An example of load 73 is a ball screw, a gear, a belt, or the like. Servo system 7 is used, for example, for executing a predetermined work in a manufacturing process of a product (which may be a semi-product).

When servo system 7 deteriorates, for example, malfunctions such as generation of abnormal noise, oscillation, slippage of load 73, and deterioration in operation accuracy of load 73 may occur. Data processing system 1 performs the deterioration diagnosis of servo system 7, and thus, the user can know whether or not servo system 7 deteriorates.

The causes of the malfunctions of servo system 7 are, for example, adhesion of foreign matter to servomotor 72 or load 73, wear of servomotor 72 or load 73, damage to servomotor 72 or load 73, and the like. The malfunctions of servo system 7 appear as detectable features such as torque disturbance of servomotor 72, a change in resonance characteristics, and a change in frictional force. Based on these features, data processing system 1 performs deterioration diagnosis.

Data processing system 1 may perform deterioration diagnosis when servo system 7 is executing a predetermined work, or may perform deterioration diagnosis by causing servo system 7 to perform a test operation when the servo system is pausing a predetermined work.

(3) Sensor

Sensor 61 detects the state of servo system 7. Sensor 61 outputs a detection signal (electric signal) including a detection value to servo amplifier 71. Servo amplifier 71 controls an operation of servomotor 72 based on the detection signal and a control signal (control value) from host controller 62 to be described later. In addition, in the present exemplary embodiment, sensor 61 also outputs the detection signal to data processing system 1. A plurality of types of sensors 61 are preferably provided. In the present exemplary embodiment, a description will be given on the assumption that a current sensor, a torque sensor, a speed sensor, and a position sensor (encoder or the like) are provided as the plurality of sensors 61.

The current sensor detects a current supplied to servomotor 72. The torque sensor detects a torque of servomotor 72. The speed sensor detects a rotation speed of servomotor 72. The position sensor detects a position of a detection target that moves to correspond to rotation of servomotor 72. For example, the position sensor detects a rotation angle of servomotor 72. In addition, for example, in a case where load 73 is a ball screw, the position sensor detects a position of the ball screw or a member connected to the ball screw in an axial direction of the ball screw. Note that, instead of the position sensor, the position of the detection target may be detected by a camera.

(4) Host Controller

Host controller 62 outputs a control signal to servo amplifier 71. Accordingly, host controller 62 controls an operation of servo system 7. The control signal includes a control value. The control signal includes, as the control value, for example, at least one value of a command value of the rotational speed of servomotor 72, a command value of the rotation angle, and a torque command value. Servo amplifier 71 adjusts power supplied to servomotor 72 according to the control signal and the detection signal from sensor 61, and thus, the operation of servomotor 72 is controlled.

In addition, host controller 62 also outputs a control signal including a (first) control value to data processing system 1. Data processing system 1 performs deterioration diagnosis based on the control signal (first control value). Data processing system 1 may perform deterioration diagnosis based on the detection signal from sensor 61.

Incidentally, servo amplifier 71 includes a power converter, and generates a control signal (second control value) for adjusting power supplied from the power converter to servomotor 72. Servo amplifier 71 may output the control signal including the second control value to data processing system 1. In this case, data processing system 1 may acquire the control signal generated by servo amplifier 71 and perform deterioration diagnosis based on the control signal. In other words, the "control signal used for controlling servo system 7" in the present disclosure may be the control signal including the first control value from host controller 62, or may be the control signal including the second control value generated by servo amplifier 71. The "control value used for controlling servo system 7" may be the first control value or the second control value.

Various detection values output from sensor 61, various (first) control values output from host controller 62, and (second) control values output from servo amplifier 71 correspond to the input values acquired by acquisition part 2. That is, the input values (the control value and the detection value) as the diagnostic parameters include at least one of the value of the current supplied to servomotor 72, the torque of servomotor 72, the speed of servomotor 72, and the value (rotation angle) of the position of servomotor 72.

(5) Data Processing System (5.1) Constituent Elements

Data processing system 1 includes a computer system including one or more processors and memories. At least some of functions of data processing system 1 are implemented by the processor of the computer system executing a program recorded in the memory of the computer system. The program may be recorded in the memory, may be provided through a telecommunication line such as the Internet, or may be recorded in a non-transitory recording medium such as a memory card.

Data processing system 1 includes acquisition part 2, generator 3, processing part 4, output part 51, receiver 52, and storage 53. Note that, acquisition part 2, generator 3, processing part 4, output part 51, and receiver 52 merely indicate functions implemented by one or more processors, and do not necessarily indicate substantial configurations.

(5.2) Acquisition Part

Acquisition part 2 acquires the diagnostic parameter. For example, data processing system 1 further includes a communication interface device, and acquisition part 2 acquires the diagnostic parameter via the communication interface device.

As illustrated in FIG. 1, the diagnostic parameter includes the input value and the generation value. An example of the input value is the detection value output from sensor 61. Another example of the input value is the control value output from at least one of host controller 62 and servo amplifier 71. An example of the generation value is an extraction value, a statistic, or a principal component. The generation value is generated by generator 3 based on the input value. Acquisition part 2 of the present exemplary embodiment acquires the input value as the diagnostic parameter. In other words, acquisition part 2 acquires at least one of the control signal (input value) from at least one of host controller 62 and servo amplifier 71 and the detection signal (input value) from sensor 61 (acquisition step). Acquisition part 2 outputs the input value to generator 3 and processing part 4.

Generator 3 generates one or a plurality of diagnostic parameters from one input value. In addition, since the input value itself is one of the diagnostic parameters, the input value itself can be used for deterioration diagnosis. In the present exemplary embodiment, the diagnostic parameter used for deterioration diagnosis is the generation value generated by generator 3.

(5.3) Generator

Generator 3 generates the generation value and outputs the generation value to processing part 4. Generator 3 includes extraction part 31, statistic part 32, statistical analysis part 33, and tendency generator 34. In the present exemplary embodiment, extraction part 31, statistic part 32, and statistical analysis part 33 correspond to first generator 3A, and tendency generator 34 corresponds to second generator 3B (see FIG. 1).

Extraction part 31 performs extraction processing on the input value to generate the extraction value. The extraction processing is processing of extracting, as the extraction value, the value of the partial period among the input values.

Statistic part 32 generates a statistic based on the input value. An example of the statistic is an average value, a standard deviation, a maximum value, a minimum value, or a feature value obtained from a histogram.

Statistical analysis part 33 statistically analyzes the input value and generates a diagnostic parameter different from the input value. More specifically, statistical analysis part 33 performs principal component analysis on the plurality of input values to generate the principal components.

In addition, generator 3 can generate the diagnostic parameter by combining two or more kinds of processing among the extraction processing in extraction part 31, the processing in statistic part 32, and the processing in statistical analysis part 33. Generator 3 of the present exemplary embodiment can generate the diagnostic parameter by combining at least one of the extraction processing in extraction part 31, the processing in statistic part 32, and the processing in statistical analysis part 33. In other words, generator 3 generates the diagnostic parameter (generation value) by performing at least one of processing of converting the input value into the statistic and the statistical analysis, and the extraction processing.

As an example, generator 3 first generates the extraction value by the extraction processing in extraction part 31. Further, generator 3 generates the diagnostic parameter by performing processing such as taking an average value of the extraction values or calculating a standard deviation of the extraction values in statistic part 32.

As another example, generator 3 first generates a plurality of extraction values by the extraction processing in extraction part 31. Further, generator 3 generates a plurality of principal components by performing principal component analysis on the plurality of extraction values in statistical analysis part 33. Generator 3 outputs the plurality of principal components as the diagnostic parameters.

In the present exemplary embodiment, a case where the diagnostic parameter directly used for deterioration diagnosis among the plurality of diagnostic parameters is the generation value generated by executing at least the following processing will be described as an example. That is, the diagnostic parameter directly used for deterioration diagnosis is the generation value generated by statistic part 32 taking an average value of the extraction values generated by extraction part 31. On the other hand, the input value as the diagnostic parameter is indirectly used for deterioration diagnosis in a form of being used for deterioration diagnosis after being converted into the generation value.

In the present disclosure, the diagnostic parameter (generation value) may be referred to as first data D1 (see FIGS. 4A to 4C). First generator 3A (extraction part 31, statistic part 32, and statistical analysis part 33) generates pieces of first data D1 regarding three feature values (for example, average values) from predetermined regions (entire or a part of the feature period to be described later) in signal waveforms of three signals, for example (first generation step).

Tendency generator 34 (second generator 3B) generates pieces of second data D2 that are pieces of time-series data indicating the progress of deterioration of object OB1 (second generation step). Tendency generator 34 preferably generates three or more pieces of second data D2 (here, three illustrated in FIGS. 4A to 4C). Each piece of second data D2 indicates a change tendency with time of first data D1 (diagnostic parameter) regarding the corresponding feature value. FIGS. 4A to 4C illustrate pieces of second data D2 regarding "feature value A", "feature value B", and "feature value C" that change with time with a horizontal axis as time. As an example, feature values A to C are all average values, but types of signals serving as the basis are different. Specifically, "feature value A" is, for example, an average value (average current value) of a predetermined region (entire or a part of the feature period) in a signal waveform of the current supplied to servomotor 72. "Feature value B" is, for example, an average value (average torque) of a predetermined region (entire or a part of the feature period) in a signal waveform of the torque of servomotor 72. "Feature value C" is, for example, an average value of a predetermined region (entire or a part of the feature period) in a signal waveform of the speed of servomotor 72.

Generator 3 stores, as history information, pieces of first data D1 regarding feature values A to C generated by first generator 3A in storage 53. Tendency generator 34 generates second data D2 corresponding to each feature value based on pieces of first data D1 regarding feature values A to C generated at a certain point in time (for example, a current point in time) and pieces of first data D1 regarding past feature values A to C stored in storage 53. In FIGS. 4A to 4C, each piece of second data D2 is illustrated as polygonal line data connecting a plurality of pieces of first data D1 (plots) arranged in time series for each generation interval T1.

Generation interval T1 between two adjacent pieces of first data D1 (plots), that is, an interval between points in time t1 and t2, an interval between points in time t2 and t3, and an interval between points in time t3 and t4 . . . are constant in the illustrated example. Generation interval T1 is not particularly limited, and may be, for example, several hours, may be one day, or may be one month. Generation interval T1 can be changed by the user via, for example, operating device 82.

In FIGS. 4A to 4C, as an example, point in time t7 is set as the current point in time. For each of feature values A to C, tendency generator 34 generates pieces of second data D2 by using latest first data D1 generated at point in time t7 (current point in time) and pieces of first data D1 in storage 53 generated at points in time t1 to t6 before point in time t7.

Tendency generator 34 outputs generated three pieces of second data D2 to processing part 4. Pieces of second data D2 are processed by presentation part 47 to be described later of processing part 4.

As aged deterioration of object OB1 progresses, feature values A to C can basically indicate the monotonous decrease as the change tendency. However, as the aged deterioration of object OB1 progresses, at least one of feature values A to C may be a feature value indicating the monotonous increase as the change tendency.

(5.4) Output Part

Output part 51 functions as a display output part that outputs the input value to display device 81. Output part 51 outputs the input value via, for example, the communication interface device. In addition, output part 51 outputs the generation value to display device 81. That is, output part 51 outputs the diagnostic parameter (input value or generation value) to display device 81 (presentation device).

In addition, output part 51 functions as the reliability output part that outputs the information regarding the reliability to display device 81 (presentation device) in association with the diagnostic parameter.

(5.5) Receiver

Receiver 52 receives a signal from operating device 82. Receiver 52 receives a signal via the communication interface device, for example.

(5.6) Processing Part

Processing part 4 has functions as classification part 41, period determination part 42, correction part 43, reliability determination part 44, learning part 45, diagnosis part 46, presentation part 47, and estimation part 48.

(5.6.1) Classification Part

Classification part 41 classifies the input values into a plurality of periods in accordance with the features of the waveforms of the input values in order to display the input values on display device 81. Pieces of information regarding the plurality of periods determined by classification part 41 are output to display device 81 via output part 51. Display device 81 displays the input values by classifying the input values into the plurality of periods classified by classification part 41.

Figure 2:
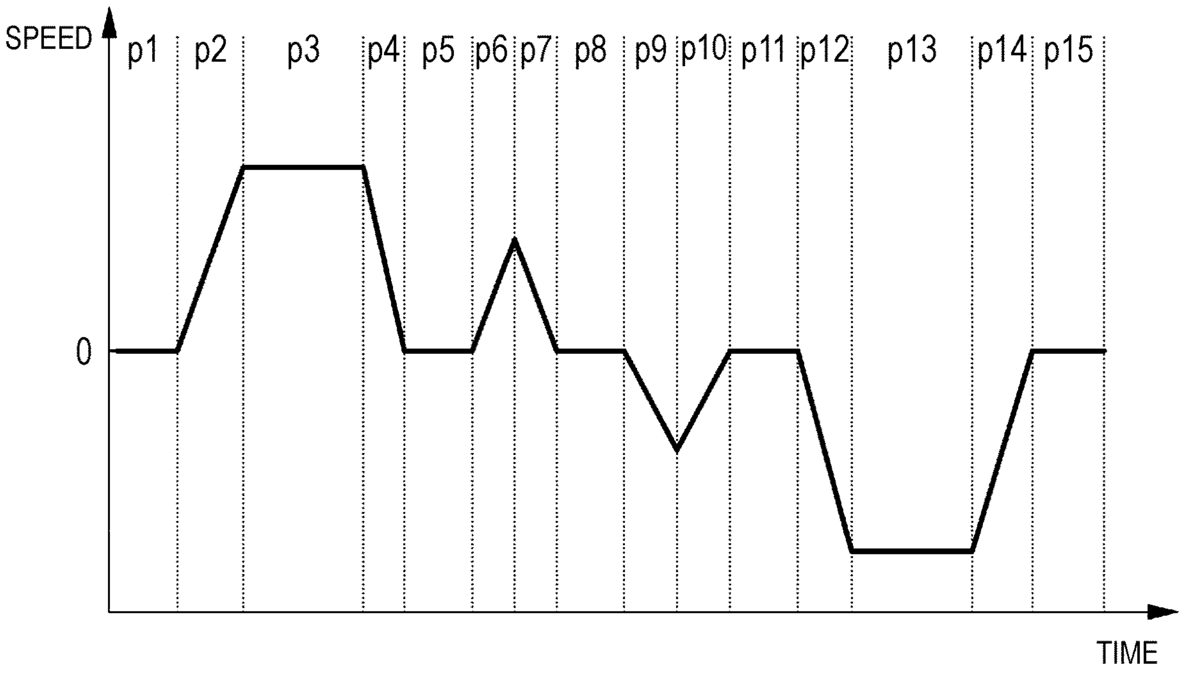
FIG. 2 is a diagram illustrating an example of screen display in the data processing system.

FIG. 2 illustrates an example of an aspect in which the control value of the speed of servomotor 72 is set as the input value and the input value is classified into a plurality of periods p1 to p15 and displayed on display device 81. Servomotor 72 is controlled to repeat the same operation with periods p1 to p15 as one cycle. That is, servomotor 72 executes an operation with periods p1 to p15 as one cycle for one workpiece. Each of periods p1 to p15 has a feature of monotonically decreasing, a feature of monotonically increasing, or a feature of a constant value. Classification part 41 classifies the input values into the plurality of periods p1 to p15 by analyzing a change rate of the input value.

The user operates operating device 82 (see FIG. 1) to designate a desired period to be adopted for deterioration diagnosis among the plurality of periods p1 to p15. Receiver 52 receives a designation signal output from operating device 82 in accordance with an operation of the user on operating device 82. The designation signal includes information for specifying the period designated by the user. When receiver 52 receives the designation signal, in the extraction processing, generator 3 extracts a value of the period designated by the operation of the user on operating device 82 among the input values. More specifically, when receiver 52 receives the designation signal, in the extraction processing, generator 3 extracts the value of the period designated by the operation of the user on operating device 82 among the plurality of periods p1 to p15 among the input values.

For example, the user designates period p7. Extraction part 31 of generator 3 generates, as the extraction value, the value of period p7 among the input values.

Figure 3:
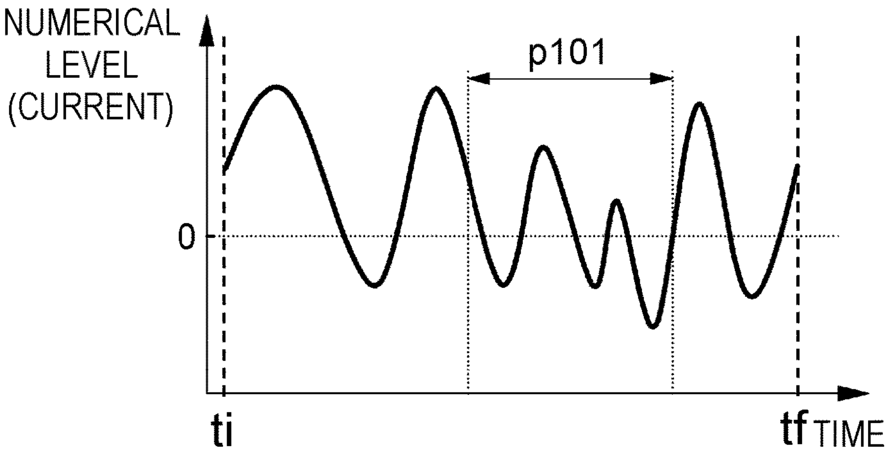
FIG. 3 is a graph representing a waveform of a current as a diagnostic parameter in the data processing system.

Here, extraction part 31 may generate, as the extraction value, the value of period p7 designated by the user among the input values displayed on display device 81. Alternatively, extraction part 31 may generate, as the extraction value, the value of period p7 designated by the user among input values different among the input values displayed on display device 81. In the example of FIG. 2, the input value displayed on display device 81 is a speed. FIG. 3 is an example of the current value in period p7 designated by the user. That is, a period from start point ti to end point tf in FIG. 3 coincides with period p7. Extraction part 31 may use such a value of the current as the extraction value.

That is, acquisition part 2 acquires a plurality of input values. The plurality of input values include first input values and second input values. In the above example, the first input value is a speed, and the second input value is a value of a current. In the extraction processing, generator 3 performs processing (first processing) of specifying a feature period in which a predetermined feature appears among the first input values, and processing (second processing) of extracting, as the diagnostic parameter (extraction value), a value included in the feature period among the second input values. Specifically, in the first processing, generator 3 sets, as the feature period, period p7 designated by the operation of the user on operating device 82. A predetermined feature in period p7 is that the speed (first input value) monotonously decreases. In addition, the input values are classified into the plurality of periods p1 to p15 such that the periods other than period p7 also have features. Accordingly, the extraction processing is processing of extracting the value of the period determined based on the predetermined feature among the input values. In the second processing, generator 3 extracts, as the diagnostic parameter, the value included in period p7 (feature period) among the values of the currents (second input values).

Generator 3 may use, as the diagnostic parameters, all the values included in the feature period.

Alternatively, generator 3 may use, as the diagnostic parameter, the value of the partial period of the feature period. In short, generator 3 may extract, as the diagnostic parameter, the value of the partial period of the feature period in the processing of extracting, as the diagnostic parameter, the value included in the feature period among the second input values. For example, generator 3 may extract, as the diagnostic parameter, a value of partial period p101 of feature period (see FIG. 3). Generator 3 may set the period p 101 as, for example, the period designated by the operation of the user on operating device 82. Alternatively, period p101 may be determined by period determination part 42 based on the feature of the waveform of the second input value, for example. The feature of the waveform of the second input value is, for example, an amplitude, a frequency, an average value in a unit time, or the like of the second input value. Alternatively, period p101 may be determined by period determination part 42 as a period corresponding to one cycle of the second input value, for example.

That is, "feature value A (see FIG. 4A)" described above may be an average value of the values of the currents in the feature period (period p7), or may be a feature value (here, an average value) of the values of the currents in the partial period (period p101) of the feature period.

(5.6.2) Period Determination Part

Period determination part 42 has a function of determining the period to be adopted for deterioration diagnosis among the input values. The validity and invalidity of the function can be switched by, for example, the operation of the user on operating device 82. In a case where the function is invalid, the period to be adopted for deterioration diagnosis is determined by the operation of the user on operating device 82. Extraction part 31 extracts, as the extraction value, the value of the period determined by period determination part 42 or by the operation of the user among the input values.

For example, period determination part 42 sets a feature period in which a predetermined feature appears among the input values as the period to be adopted for deterioration diagnosis. Information indicating which period is adopted for deterioration diagnosis is stored in storage 53. Period determination part 42 determines the period to be adopted for deterioration diagnosis by referring to the information. In addition, the information can be updated by the operation of the user on operating device 82.

In a case where the user determines the period to be adopted for deterioration diagnosis, there is an advantage that knowledge of the user can be reflected in the deterioration diagnosis. It is assumed that an appropriate period as the period to be adopted for deterioration diagnosis varies depending on an installation environment, a use situation, and the like of servo system 7. The user can determine the period to be adopted for deterioration diagnosis, and thus, the accuracy of the deterioration diagnosis can be improved.

In addition, in a case where period determination part 42 determines the period to be adopted for deterioration diagnosis, there is an advantage that time and effort for the user to determine the period can be saved.

(5.6.3) Presentation Part

Presentation part 47 has a function (presentation step) of comparing three or more pieces of second data D2 (here, three illustrated in FIGS. 4A to 4C) generated by tendency generator 34 (second generator 3B) with each other. Presentation part 47 specifies the change tendency by analyzing a direction and a change rate of a change (increase, decrease, or constant) between pieces of adjacent first data D1 (plots) for each piece of second data D2. The "change tendency" mentioned here is assumed to be a tendency correlated with the progress of deterioration. That is, the change tendency means a tendency of a monotonous change in one direction from point in time t1 to point in time t7 in FIGS. 4A to 4C. The "one direction" is assumed to be, for example, a monotonous decrease direction, but may be a monotonous increase direction depending on the type of the diagnostic parameter. It can be said that both feature values A and B in FIGS. 4A and 4B monotonously decrease from point in time t1 to point in time t7 and indicate the same change tendency.

Note that, in a case where one of feature value A and feature value B monotonically decreases from point in time t1 to point in time t7 and the other monotonically increases from point in time t1 to point in time t7, the feature value indicates the same change tendency (tendency correlated with the progress of (a degree of) deterioration). However, feature value C in FIG. 4C does not change in one direction from point in time t1 to point in time t7. That is, although second data D2 in FIG. 4C indicates the decreasing tendency, unlike second data D2 in FIGS. 4A and 4B, there is a section (from point in time t2 to point in time t3) in which the second data temporarily indicates an increasing tendency under the influence of noise or the like. In other words, in second data D2 of FIG. 4C, there is a section having no correlation with the progress of deterioration. When second data D2 including the section having no correlation with the progress of deterioration due to the influence of noise or the like is presented to the user, misleading may be caused in the deterioration diagnosis.

Therefore, presentation part 47 determines whether or not there is specific second data D20 (see FIG. 4C) having a change tendency different from another second data D2. For example, in a case where the change tendencies of pieces of second data D2 of more than half of three or more pieces of second data D2 indicate a monotonous decrease while there is less than half (for example, one) of pieces of second data D2 exhibiting a change tendency different from the monotonous decrease, presentation part 47 determines second data D2 as specific second data D20.

When the change tendencies of all three pieces of second data D2 are the same and it is determined that there is no specific second data D20, presentation part 47 presents three pieces of second data D2 without performing the "specific processing". Presentation part 47 causes display device 81 to output three pieces of second data D2 via output part 51, and presents (displays) three pieces of second data D2 from display device 81 (on a screen).

On the other hand, in a case where there is specific second data D20 exhibiting the change tendency different from another second data D2, presentation part 47 performs the specific processing related to object data D10 which is first data D1 that causes the different change tendency and presents specific second data D20 (presentation step). In specific second data D20 exemplified in FIG. 4C, there is a section (from point in time t2 to point in time t3) that temporarily indicates an increasing tendency. Presentation part 47 determines that first data D1 at point in time t3 is object data D10 that causes the different change tendency. Presentation part 47 may determine that pieces of first data D1 before and after first data D1 at point in time t3 are also pieces of object data D10.

The specific processing includes processing related to at least one of non-presentation of object data D10, correction of object data D10, and notification related to object data D10.

Presentation part 47 causes display device 81 to output specific second data D20 on which the specific processing is performed via output part 51, and presents specific second data D20 by screen display from display device 81. For example, display device 81 displays specific second data D20 as the graph of the polygonal line data illustrated in FIG. 4C. The user can visually confirm a status of progress of deterioration through specific second data D20 displayed on the screen.

In addition, presentation part 47 presents specific second data D20 in an aspect including first data D1 generated by first generator 3A at a certain point in time (here, current point in time t7) and first data D1 generated by first generator 3A before the certain point in time (point in time t7). Specifically, as illustrated in FIG. 4C, presentation part 47 presents specific second data D20 in an aspect including seven pieces of first data D1 at points in time t1 to t7. Therefore, the user can confirm a status of progress of deterioration up to point in time t7 through specific second data D20 to be presented.

Presentation part 47 preferably presents not only specific second data D20 but also another second data D2. That is, presentation part 47 preferably further presents at least one of second data D2 other than specific second data D20 among three or more pieces of second data D2 (here, two pieces of second data D2 of feature value A and feature value B). For example, display device 81 displays two pieces of second data D2 of feature value A and feature value B as the graphs of the polygonal line data illustrated in FIGS. 4A and 4B. The "presentation" of data mentioned here is not limited to screen display, and may include voice output and the like. For example, the notification related to object data D10 may be performed by voice output. Second data D2 other than specific second data D20 is preferably displayed on one screen together with specific second data D20, but is not particularly limited, and may be displayed on another screen.

Hereinafter, non-presentation processing, correction processing, and notification processing will be described. Presentation part 47 may execute the specific processing only in a case where a temporary increase amount in the monotonous decrease of the feature value is more than or equal to a threshold value. In addition, presentation part 47 may execute the specific processing only in a case where a temporary decrease amount in the monotonous increase of the feature value is more than or equal to a threshold value.

[Non-Presentation Processing]

For example, in a case where the specific processing includes the non-presentation processing related to non-presentation of object data D10, presentation part 47 stops the screen display of object data D10 by display device 81. In the example of FIG. 4C, presentation part 47 stops the screen display of first data D1 (object data D10) at point in time t3 by display device 81 in specific second data D20. Specifically, for specific second data D20, presentation part 47 does not display (blank) the polygonal line data from point in time t2 to point in time t4 including first data D1 (plot) at point in time t3, and displays the polygonal line data from points in time t1 to t2 and after point in time t4 on the screen. As described above, since the screen display of object data D10 that is likely to be generated by the influence of noise or the like is stopped, it is possible to prevent misleading from being caused in the deterioration diagnosis.

[Correction Processing]

For example, in a case where the specific processing includes the correction processing related to correction of object data D10, presentation part 47 causes correction part 43 to correct object data D10 based on a change tendency of at least one of pieces of second data D20 other than specific second data D2 among three or more pieces of second data D2. Presentation part 47 presents corrected object data D10. Here, presentation part 47 presents (displays) specific second data D20 including corrected object data D10 from display device 81.

Corrected object data D10 is data to be presented by presentation part 47. For the deterioration diagnosis by diagnosis part 46, uncorrected object data D10 may be used, or corrected object data D10 may be used.

Correction part 43 executes the correction processing related to object data D10 in accordance with a command from presentation part 47. In the example of FIG. 4C, correction part 43 corrects first data D1 (object data D10) at point in time t3 in specific second data D20.

Here, presentation part 47 causes correction part 43 to correct object data D10 based on a past change tendency earlier than object data D10 in specific second data D20 and presents corrected object data D10. In the example of FIG. 4C, correction part 43 corrects object data D10 at point in time t3 based on two pieces of first data D1 at points in time t1 and t2 before point in time t3 and the monotonically decreasing change rate (slope) thereof. Thus, the reliability regarding the correction of object data D10 is improved. In the present exemplary embodiment, correction part 43 estimates true first data D1X (see FIG. 4C) at point in time t3 based on the plurality of pieces of first data D1 after point in time t4 and change rates thereof in addition to two pieces of first data D1 and change rates thereof at points in time t1 to t2. Correction part 43 interpolates rue polygonal line data K1 (see a broken line in FIG. 4C) between points in time t2 to t4 including estimated first data D1X.

Correction part 43 may interpolate polygonal line data K1 based on correlation data. The correlation data is information regarding the correlation between the type of first data D1 (diagnostic parameter), the value of first data D1, and the progress of deterioration of servo system 7, and is stored in storage 53. The correlation data is information prepared based on a verification result such as a simulation result, and may be stored as a data table or a mathematical expression.

Presentation part 47 preferably corrects object data D10 with an approximate curve. That is, true first data D1X at point in time t3 is preferably determined by the approximate curve. In this case, the reliability regarding the correction of object data D10 is improved.

As described above, since object data D10 having a high possibility of being generated by the influence of noise or the like is corrected and presented, it is possible to more hardly cause misleading in the deterioration diagnosis.

In a case where specific second data D20 is displayed on the screen from display device 81, presentation part 47 preferably displays corrected object data D10 on the screen in a display form distinguishable from another first data D1. The distinguishable display form is, for example, a color, a line type, or the like. For example, as illustrated in FIG. 4C, presentation part 47 may display corrected object data D10 (first data D1X) as a white plot and may display another first data D1 as a black plot. In addition, as illustrated in FIG. 4C, presentation part 47 may display true polygonal line data K1 between points in time t2 to t4 including first data D1X with a red broken line and may display another data with a black solid line. Corrected object data D10 is displayed in a display form distinguishable from another first data D1, and thus, the user can easily visually confirm that object data D10 is corrected data.

[Notification Processing]

For example, in a case where the specific processing includes the notification processing related to object data D10, in a case where specific second data D20 is displayed on the screen from display device 81, presentation part 47 displays warning information indicating that specific second data D20 exhibits the change tendency different from another second data D2 on the screen. The warning information includes, for example, data of a character string such as "there is data with change tendency different from another data." The warning information is preferably displayed on one screen together with specific second data D20, but is not particularly limited, and may be displayed on another screen. In addition, the notification of the warning information is not limited to screen display, and may be performed by voice output from a speaker. Since the warning information is notified, the user can easily know that there is object data D10 having a high possibility of being generated by the influence of noise or the like through the warning information. Thus, it is possible to make it difficult to cause misleading in the deterioration diagnosis.

In a case where the specific processing includes the notification processing and the non-presentation processing, the warning information may include, for example, data of a character string such as "since there is data with change tendency different from another data, warning information is not displayed." In addition, in a case where the specific processing includes the notification processing and the correction processing, the warning information may include, for example, data of a character string such as "since there is data with change tendency different from another data, data correction is performed."

In the present exemplary embodiment, the user may appropriately change the setting of which of the non-presentation processing, the correction processing, and the notification processing the specific processing includes via operating device 82.

As described above, according to the present exemplary embodiment, in a case where there is specific second data D20 exhibiting the different change tendency, specific second data D20 is presented by performing the specific processing related to the object data D10 that causes the different change tendency. Thus, the user hardly misunderstands object data D10 having a high possibility of being generated by the influence of noise or the like as true data. As a result, data processing system 1 has an advantage that misleading is less likely to be caused in the deterioration diagnosis.

(5.6.4) Reliability Determination Part and Estimation Part

Reliability determination part 44 gives, to the diagnostic parameter (first data D1), the information regarding the reliability of the diagnostic parameter in the deterioration diagnosis of servo system 7. The diagnostic parameter mentioned here may be the input value acquired by acquisition part 2 or the generation value generated by generator 3 based on the input value. The reliability may be set higher as the correlation between the diagnostic parameter and the degree of deterioration of servo system 7 is stronger.

Reliability determination part 44 has a function of determining the reliability according to the operation of the user on operating device 82 and a function of automatically determining the reliability. First, the former function will be described.

As illustrated in FIG. 2, the diagnostic parameters are displayed on display device 81. The user designates the reliability of the diagnostic parameter by operating operating device 82. Receiver 52 receives a designation signal output from operating device 82 in accordance with an operation of the user on operating device 82. The designation signal includes information on the reliability designated by the user. When receiver 52 receives the designation signal, reliability determination part 44 determines the reliability to be a value designated by the operation of the user on operating device 82.

In addition, in a case where a plurality of diagnostic parameters (pieces of second data D2 including the plurality of pieces of first data D1) are displayed on display device 81, the reliabilities of the plurality of diagnostic parameters can be individually designated by the operation of the user on operating device 82.

Next, the function of automatically determining the reliability by reliability determination part 44 will be described. Here, reliability determination part 44 has a function of automatically determining not only the reliability of one certain diagnostic parameter (first data D1) but also the reliability of second data D2 including the plurality of diagnostic parameters (hereinafter, may be referred to as "overall reliability"). In particular, reliability determination part 44 has a function of automatically determining the overall reliability of specific second data D20 exhibiting the change tendency different from another second data D2. Reliability determination part 44 determines the reliability (overall reliability) regarding the change tendency of specific second data D20 based on a change tendency of reference data having the same type of feature value as specific second data D20. The "reference data" mentioned here is a diagnostic parameter generated in the past or a diagnostic parameter related to another device. Specifically, the "reference data" is one or more pieces of first data D1 or second data D2 generated in the past for a servomotor different from servomotor 72 of interest. However, when the feature value of specific second data D20 is the average value of the current, the feature value of the reference data is also the average value of the current. The reference data is stored in storage 53. The reference data may be stored as a data table or a mathematical expression.

Note that, in the present exemplary embodiment, reliability determination part 44 determines the reliability of the diagnostic parameter and the overall reliability by using the trained model generated by machine learning. The trained model may be generated by learning part 45, or may be generated by a device outside data processing system 1 and may be provided to data processing system 1.

The trained model includes, for example, a classifier using a trained neural network. The trained neural network may include, for example, a convolutional neural network (CNN), a bayesian neural network (BNN), or the like. The trained model can be implemented by mounting the trained neural network on an integrated circuit such as an application specific integrated circuit (ASIC) or a field-programmable gate array (FPGA).

In a case where the reliability of the diagnostic parameter is determined by the user, there is an advantage that the knowledge of the user can be reflected in the reliability. It is assumed that an appropriate value as the reliability of the diagnostic parameter varies depending on the installation environment, the use situation, and the like of servo system 7. The user can determine the reliability of the diagnostic parameter, and thus, the reliability can be set to an appropriate value.

In addition, in a case where period determination part 42 determines the reliability, there is an advantage that time and effort for the user to determine the reliability of the diagnostic parameter can be saved.

When the reliability of the diagnostic parameter is determined, reliability determination part 44 outputs the diagnostic parameter and the information regarding the reliability of the diagnostic parameter to the presentation device via output part 51. The presentation device presents the diagnostic parameter and the reliability thereof. In the present exemplary embodiment, display device 81 functions as the presentation device. Display device 81 displays the diagnostic parameter and the reliability thereof.

In addition, reliability determination part 44 also determines the overall reliability of specific second data D20. In a case where specific second data D20 is displayed on the screen from display device 81, presentation part 47 displays the information regarding the reliability (overall reliability) on the screen. Reliability determination part 44 automatically determines not only specific second data D20 but also the overall reliability of another second data D2. In a case where second data D2 is displayed on the screen from display device 81, presentation part 47 displays the information regarding the overall reliability on the screen. The user can easily know how reliable specific second data D20 is through the information on the overall reliability displayed on the screen. Thus, it is possible to make it more difficult to cause misleading in the deterioration diagnosis.

Figure 5:
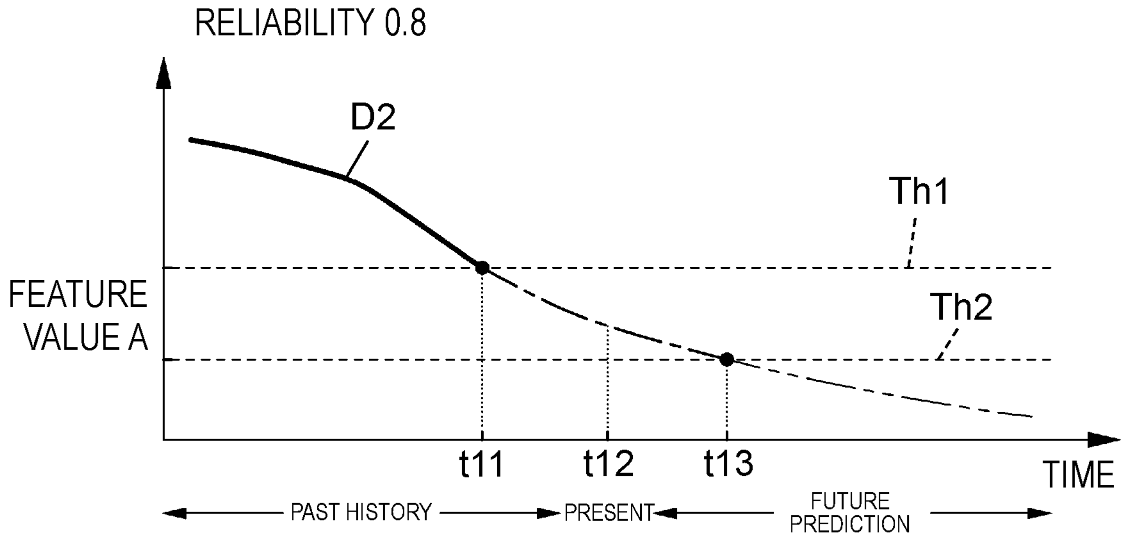
FIG. 5 is a diagram for describing second data displayed from a display device and an overall reliability of the second data in the data processing system.

FIG. 5 schematically illustrates the display of display device 81 including the display of the overall reliability. FIG. 5 illustrates, as an example, second data D2 of feature value A described in FIG. 4A and the overall reliability "0.8" thereof. In FIG. 5, point in time t12 is a current point in time (present time). That is, first data D1 at point in time t12 indicates latest result data, and first data D1 at a point in time before point in time t12 indicates past result data. Display device 81 indicates the overall reliability in a range from "0" to "1.0", but is not particularly limited, and may indicate the overall reliability in a range from "0%" to "100%" in percentages.

Here, first data D1 at a point in time after point in time t12 is not the result data but prediction data related to first data D1. Presentation part 47 of the present exemplary embodiment presents specific second data D20 in an aspect including first data D1 generated by first generator 3A at a certain point in time (point in time t12) and prediction data related to future first data D1 after the certain point in time (point in time t12).

Specifically, estimation part 48 estimates future first data D1 in accordance with a command from presentation part 47. Estimation part 48 estimates first data D1 at the point in time after point in time t12 based on, for example, first data D1 and the change tendency generated by a certain point in time (point in time t12), the reference data, the correlation data, and the like described above. Note that, presentation part 47 preferably presents second data D2 other than specific second data D20 in an aspect including the prediction data related to future first data D1 after the certain point in time (point in time t12).

Since specific second data D20 is presented in an aspect including future first data D1 in this manner, the user can confirm a status of progress of future deterioration predicted from a certain point in time through presented specific second data D20.

(5.6.5) Learning Part

Learning part 45 generates trained models (first trained model and second trained model). In the first trained model, the diagnostic parameter (first data D1) is used as an input, and the reliability of the diagnostic parameter is used as an output. In the second trained model, second data D2 including the plurality of diagnostic parameters is used as an input, and the overall reliability of second data D2 is used as an output.

Operating device 82 transmits a designation signal including the information on the reliability (label) of the specific diagnostic parameter and the overall reliability (label) of second data D2 in accordance with the operation of the user. Learning part 45 performs machine learning using the designation signal as teacher data to generate the trained model. In addition, similarly, learning part 45 can cause the trained model to retrain.

(5.6.6) Diagnosis Part

Diagnosis part 46 performs the deterioration diagnosis of servo system 7 based on the diagnostic parameter. Any one of the generation value generated by generator 3 and the input value acquired by acquisition part 2 can be used as the diagnostic parameter. In the present exemplary embodiment, a case where diagnosis part 46 uses, as the diagnostic parameter, the generation value generated by generator 3 will be described as an example.

The diagnostic parameter used for the deterioration diagnosis can be designated (selected) by the operation of the user on operating device 82, or can be automatically determined by diagnosis part 46. First, a case where the user designates the diagnostic parameter will be described.

The plurality of diagnostic parameters are displayed on display device 81 (see FIGS. 4A to 4C). The user designates which diagnostic parameter among the plurality of diagnostic parameters is used for the deterioration diagnosis by operating operating device 82. By doing this, operating device 82 outputs a designation signal including information on a content designated by the user.

Receiver 52 receives a designation signal output from operating device 82 in accordance with an operation of the user on operating device 82. When receiver 52 receives the designation signal, diagnosis part 46 performs deterioration diagnosis of servo system 7 based on the diagnostic parameter designated by the operation of the user on operating device 82.

Display device 81 displays the reliability of each of the plurality of diagnostic parameters. The user can select the diagnostic parameter used for the deterioration diagnosis among the plurality of diagnostic parameters while referring to the reliability. Since a diagnostic parameter in period p1, a diagnostic parameter in period p2, . . . , and a diagnostic parameter in period p16 in FIG. 2 correspond to the extraction values extracted by extraction part 31, respectively, these diagnostic parameters can be candidates for the diagnostic parameter used for the deterioration diagnosis. Accordingly, an operation of designating the diagnostic parameter used for the deterioration diagnosis includes an operation of designating one or more periods among the plurality of periods p1 to p16. Output part 51 outputs recommendation information to display device 81, and display device 81 displays the recommendation information. As described above, output part 51 functions as a display output part that outputs the recommendation information to display device 81. The recommendation information is information regarding whether or not to recommend a specific period among the plurality of periods p1 to p16. The recommendation information of the present exemplary embodiment is reliability. That is, the reliability is also given to each of the plurality of periods p1 to p16. For a certain period of the plurality of periods p1 to p16, the higher the reliability is, the more recommended the period is, and the lower the reliability is, the less recommended the period is.

In a case where diagnosis part 46 automatically determines the diagnostic parameter used for the deterioration diagnosis, for example, diagnosis part 46 sets, as the diagnostic parameter used for the deterioration diagnosis a diagnostic parameter having a highest reliability among the plurality of diagnostic parameters.

Information regarding a correlation among the type of the diagnostic parameter, the value of the diagnostic parameter, and the degree of deterioration of servo system 7 is stored in storage 53. For example, the information is stored as a data table or a mathematical expression. Diagnosis part 46 performs the deterioration diagnosis of servo system 7 by using the above information.

Diagnosis part 46 is configured to determine the degree of deterioration of object OB1 related to the corresponding feature value for each of three or more pieces of second data D2.

For example, diagnosis part 46 adopts, as the diagnostic parameter (first data D1) in each piece of second data D2, an average current value that is a value obtained by time-averaging an amplitude of the current supplied to servomotor 72. Diagnosis part 46 diagnoses that the degree of deterioration is larger as an absolute value of the average current value is smaller.

In addition, for example, diagnosis part 46 adopts, as the diagnostic parameter in each piece of second data D2, an average torque which is a value obtained by time-averaging the torque of servomotor 72. Diagnosis part 46 diagnoses that the degree of deterioration is larger as the average torque is smaller.

In addition, for example, diagnosis part 46 adopts, as the diagnostic parameter in each piece of second data D2, a principal component that is a value generated by performing principal component analysis on the detection value or the like of the position sensor. Diagnosis part 46 diagnoses that the degree of deterioration is larger as the principal component is smaller or the principal component is larger. Among the first principal component, the second principal component, and the like generated by the principal component analysis, a principal component having a relatively strong correlation with the degree of deterioration of servo system 7 may be selected by the user or diagnosis part 46 and may be used for the deterioration diagnosis.

In order to further improve the accuracy of the deterioration diagnosis, diagnosis part 46 may perform the deterioration diagnosis by using the trained model generated by machine learning. The trained model is generated by performing machine learning by using, as the teacher data, a set of the diagnostic parameter and the degree (label) of deterioration.

Diagnosis part 46 outputs the degree of deterioration as the diagnosis result.

Output part 51 functions as a presentation output part that outputs the diagnosis result of diagnosis part 46 to the presentation device. The presentation device is a device that presents information, and presents information by, for example, an image, sound, or a combination thereof. In the present exemplary embodiment, display device 81 functions as the presentation device.

In addition, the determination corresponding to a range of the degree of deterioration may be displayed on display device 81. In other words, presentation part 47 may display three or more pieces of second data D2 on the screen from display device 81 in an aspect in which the degree of deterioration determined by diagnosis part 46 is visually recognizable. For example, as illustrated in FIG. 5, first threshold value Th1 and second threshold value Th2 (first threshold value Th1>second threshold value Th2) are set, and diagnosis part 46 determines degrees of deterioration in three stages of "good", "caution", and "warning" based on first threshold value Th1 and second threshold value Th2. The degree of deterioration is not limited to be determined in three stages, and may be determined in two stages or four or more stages. When the feature value is equal to or more than first threshold value Th1, the determination that the degree of deterioration is "good" is displayed. In FIG. 5, it is determined as "good" until point in time t11, and second data D2 is indicated by, for example, a green solid line. When the feature value is less than first threshold value Th1 and more than or equal to second threshold value Th2, the determination that the degree of deterioration is "caution" is displayed. In FIG. 5, it is determined as "caution" from point in time t11 to point in time t 13, and second data D2 is indicated by, for example, a yellow alternate long and short dashed line. When the feature value is less than second threshold value Th2, the determination that the degree of deterioration is "warning" is displayed. In FIG. 5, it is determined as "warning" after point in time t13, and second data D2 is indicated by, for example, a red two-dot chain line. Note that, in FIG. 5, future first data D1 estimated by estimation part 48 is illustrated after point in time t12. Diagnosis part 46 displays estimated future first data D1 such that the degrees of deterioration in three stages can be recognized.

Since three or more pieces of second data D2 are displayed in an aspect in which the degree of deterioration is visually recognizable, the user can easily know the degree of deterioration of object OB1 through three or more pieces of second data D2 displayed on the screen.

(5.7) Storage

Examples of storage 53 are a read only memory (ROM), a random access memory (RAM), or an electrically erasable programmable read only memory (EEPROM). Storage 53 stores information used in data processing system 1. For example, storage 53 stores information on a predetermined feature of the input value for classification part 41 to classify the input value into the plurality of periods for each feature. In addition, storage 53 stores the trained model used by reliability determination part 44. In addition, as described above, storage 53 stores the reference data, the correlation data, and the like.

(6) Display Device

Display device 81 includes a display. Display device 81 performs display corresponding to the information acquired from output part 51. Display device 81 displays a waveform of the diagnostic parameter, the reliability of the diagnostic parameter, and the degree of deterioration as the diagnosis result of diagnosis part 46. In addition, display device 81 displays setting information of data processing system 1.

As described above, display device 81 functions as the presentation device that presents information. That is, the presentation device is display device 81 that displays the waveform and the reliability of the diagnostic parameter.

(7) Operating Device operating device 82 includes, for example, one or more of a keyboard, a touch pad, and a button, operating device 82 is used together with display device 81. The user operates operating device 82 to input information while referring to the information displayed on display device 81.

operating device 82 may be formed integrally with display device 81. For example, the touch pad of operating device 82 and the display of display device 81 may constitute a touch panel.

(8) Deterioration Diagnosis

Figure 6:
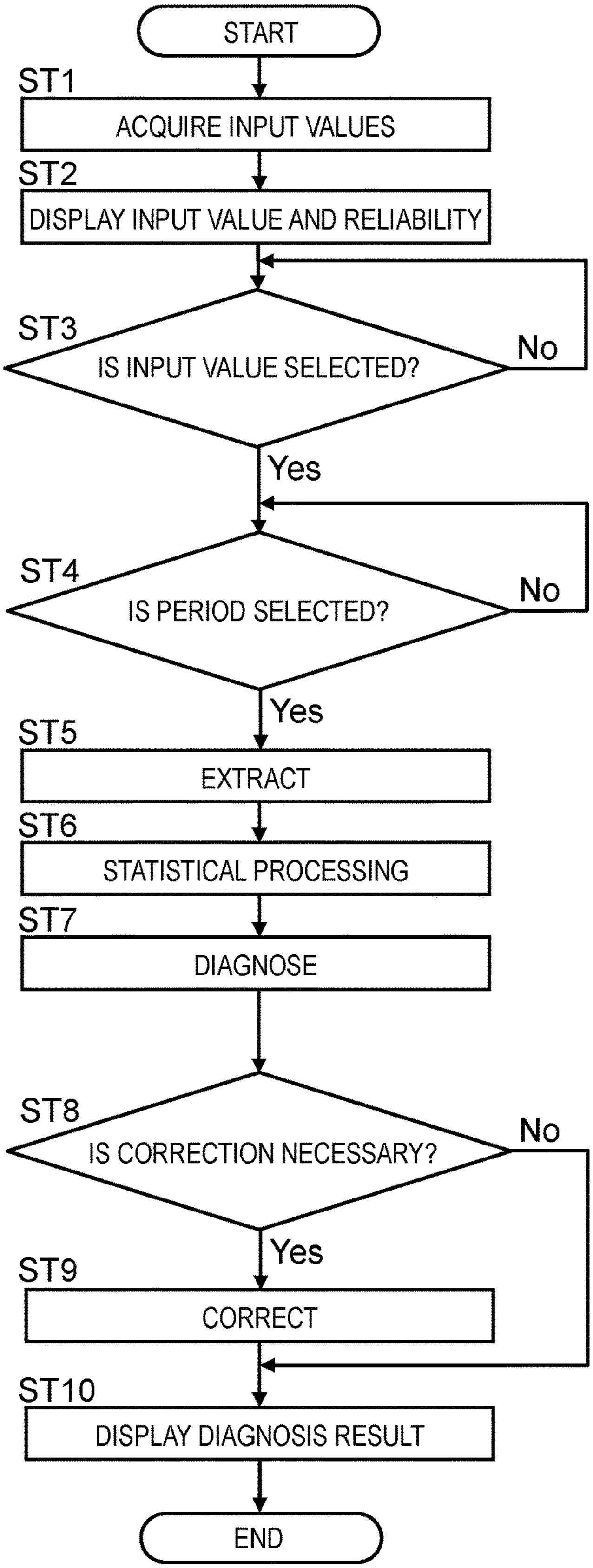
FIG. 6 is a flowchart for describing an operation in the data processing system.

A series of flow of the deterioration diagnosis of servo system 7 using data processing system 1 will be described with reference to FIG. 6. Note that, the flowchart illustrated in FIG. 6 is merely an example of the flow of the deterioration diagnosis according to the present disclosure, and an order of kinds of processing may be appropriately changed, or the processing may be appropriately added or omitted.

Acquisition part 2 acquires the plurality of input values from sensor 61 and at least one of host controller 62 and servo amplifier 71 (step ST1).

Subsequently, output part 51 outputs the plurality of input values and a plurality of reliabilities corresponding to the plurality of input values to display device 81. Display device 81 displays the plurality of input values and the plurality of reliabilities (step ST2). In addition, display device 81 displays the input values while classifying the input values into the plurality of periods p1 to p15.

The user operates operating device 82 to select one or more input values used for the deterioration diagnosis among the plurality of input values (step ST3).

Subsequently, the user selects a period to be used for the deterioration diagnosis for the selected input value. When the user selects at least one period among the plurality of periods p1 to p15 (step ST4: Yes), extraction part 31 extracts a value of the selected period among the input values and generates an extraction value (step ST5). The period selected by the user may be applied to all of the plurality of input values, or the period may be individually selected for each input value.

Generator 3 performs statistical processing on the extraction value (step ST6). Specifically, statistic part 32 of generator 3 generates the statistic based on the extraction value, and statistical analysis part 33 generates the principal component based on the extraction value.

Diagnosis part 46 performs the deterioration diagnosis of servo system 7 based on at least one of the extraction value extracted by extraction part 31, the statistic generated by statistic part 32, and the principal component generated by statistical analysis part 33 (step ST7).

Correction part 43 compares the plurality of pieces of second data D2 and determines whether or not specific second data D20 necessary to be corrected is included (step ST8). In a case where it is determined that specific second data D20 is included, correction part 43 corrects specific second data D20 (step ST9). In a case where it is determined that specific second data D20 is not included, step ST9 is omitted.

Display device 81 displays the diagnosis result of diagnosis part 46 (step ST10). As illustrated in FIG. 5, display device 81 displays each piece of second data D2 together with the reliability (overall reliability) in a visually recognizable aspect with respect to the degree of deterioration determined by diagnosis part 46. In a case where specific second data D20 is corrected in step ST9, corrected specific second data D20 is displayed.

MODIFIED EXAMPLE

Hereinafter, modified examples of the exemplary embodiment will be listed. The following modified examples may also be implemented in combinations, as appropriate.

The statistical processing in statistic part 32 and statistical analysis part 33 may be performed before the extraction processing in extraction part 31.

In data processing system 1, the statistical processing is not essential processing.

In addition, statistic part 32 and statistical analysis part 33 may be provided outside data processing system 1. Acquisition part 2 may acquire at least one of the statistic generated by statistic part 32 and the principal component generated by statistical analysis part 33.

Extraction part 31 may be provided outside data processing system 1. Acquisition part 2 may acquire the extraction value from extraction part 31.

In the deterioration diagnosis, it is not essential that the extraction processing by extraction part 31 is performed. For example, diagnosis part 46 may perform the deterioration diagnosis based on the input value, the statistic, or the values of all the periods of the principal component.

It is not essential that data processing system 1 includes diagnosis part 46. Instead of diagnosis part 46, an external configuration of data processing system 1 may perform deterioration diagnosis. Alternatively, a person may perform deterioration diagnosis by viewing the diagnostic parameter displayed on display device 81.

An acceleration sensor or a temperature sensor may be used as sensor 61. In addition, in a case where a plurality of servo systems 7 are used in synchronization with each other, a sensor that detects the state of another servo system 7 may be used as sensor 61. For example, in a case where multi-axis control is performed by the plurality of servo systems 7, since operation states of the plurality of servo systems 7 may influence each other, it is possible to use the detection result of the state of another servo system 7 for the deterioration diagnosis of servo system 7.

Diagnosis part 46 may output a signal indicating whether or not the servo system deteriorates instead of outputting the degree of deterioration as the diagnosis result.

The presentation device that presents the diagnosis result of diagnosis part 46 is not limited to display device 81. The presentation device may be, for example, a voice output device that presents a diagnosis result by voice.

It is not essential that the presentation device is display device 81 that displays the reliability of the diagnostic parameter together with the waveform of the diagnostic parameter. The presentation device may present the reliability of the diagnostic parameter by voice or the like together with the label (name or the like) of the diagnostic parameter.

Classification part 41 may classify the input values into the plurality of periods in accordance with the features of the waveforms of the input values by comparing model data representing the predetermined feature of the input value with the input value.

Correction part 43 is not limited to correcting only first data D1 (object data D 10) at point in time t3, and may also correct first data D1 before and after point in time t3.

The warning information presented (displayed on the screen) by presentation part 47 is not limited to including data of a character string such as "there is data with change tendency different from another data." The warning information may include data such as a figure (for example, an icon), a symbol, and a number in addition to the character string data.

Data processing system 1 in the present disclosure includes a computer system. The computer system mainly includes a processor and a memory as hardware. At least some of the functions as data processing system 1 in the present disclosure are implemented by the processor executing the program recorded in the memory of the computer system. The program may be recorded in advance in the memory of the computer system, may be provided through a telecommunication line, or may be provided by being recorded in a non-transitory recording medium such as a memory card, an optical disk, or a hard disk drive readable by the computer system. The processor of the computer system includes one or a plurality of electronic circuits including a semiconductor integrated circuit (IC) or a large-scale integration (LSI). The integrated circuit such as an IC or an LSI mentioned here is called differently depending on a degree of integration, and includes integrated circuits called a system LSI, a very large scale integration (VLSI), or an ultra large scale integration (ULSI). Further, a field-programmable gate array (FPGA) programmed after manufacture of LSI, and a logical device capable of reconfiguring a joint relationship in LSI or reconfiguring circuit partitions in LSI can also be used as processors. The plurality of electronic circuits may be aggregated in one chip or may be provided in a distributed manner on a plurality of chips. The plurality of chips may be aggregated in one device or may be provided in a distributed manner in a plurality of devices. The computer system mentioned here includes a microcontroller having one or more processors and one or more memories. Therefore, the microcontroller also includes one or a plurality of electronic circuits including a semiconductor integrated circuit or a large-scale integrated circuit.

In addition, the aggregation of the plurality of functions in data processing system 1 in one device is not essential to data processing system 1, and the constituent elements of data processing system 1 may be distributed to a plurality of devices. Further, at least some of the functions of data processing system 1, for example, some of the functions of processing part 4 may be implemented by a cloud (cloud computing) or the like.

Conversely, in the exemplary embodiment, the functions distributed to the plurality of devices may be aggregated in one device. For example, the functions distributed to data processing system 1, display device 81, and operating device 82 may be integrated into one device.

CONCLUSION

The following aspects are disclosed based on the exemplary embodiment and the like described above.

Data processing system (1) according to a first aspect is used for deterioration diagnosis of object (OB1) of at least one of load (73) and servomotor (72) in servo system (7). Servo system (7) includes load (73), servo amplifier (71), and servomotor (72) that applies power to load (73) in accordance with control of servo amplifier (71). Data processing system (1) includes acquisition part (2), first generator (3A), second generator (3B), and presentation part (47). Acquisition part (2) acquires at least one signal of a control signal used for controlling servo system (7) and a detection signal output from sensor (61) that detects a state of servo system (7). First generator (3A) generates pieces of first data (D1) regarding three or more feature values from a predetermined region in a signal waveform of at least one signal. Second generator (3B) generates three or more pieces of second data (D2) that are time-series data indicating the progress of deterioration of object (OB1), and the three or more pieces of second data indicate change tendencies with time of pieces of first data (D1) regarding three or more feature values, respectively. Presentation part (47) compares three or more pieces of second data (D2) with each other. Presentation part (47) presents specific second data (D20) exhibiting a change tendency different from the change tendencies of the other pieces of second data (D2) by performing specific processing related to object data (D10) that is first data (D1) that causes the different change tendency in a case where there is specific second data (D20). The specific processing includes processing related to at least one of non-presentation of object data (D10), correction of object data (D10), and notification related to object data (D10).

According to the above aspect, in a case where there is specific second data (D20) exhibiting the different change tendency, specific second data (D20) is presented by performing the specific processing related to object data (D10) that causes the different change tendency. Thus, the user hardly misunderstands object data (D10) having a high possibility of being generated by the influence of noise or the like as true data. As a result, data processing system (1) has an advantage that misleading is less likely to be caused in the deterioration diagnosis.

With regard to data processing system (1) according to a second aspect, in the first aspect, presentation part (47) presents specific second data (D20) by screen display from display device (81).

According to the above aspect, the user can visually confirm a status of progress of deterioration through specific second data (D20) displayed on the screen.

With regard to data processing system (1) according to a third aspect, in the first or second aspect, presentation part (47) presents specific second data (D20) in an aspect including first data (D1) generated by first generator (3A) at a certain point in time and first data (D1) generated by first generator (3A) before the certain point in time.

According to the above aspect, the user can confirm a status of progress of deterioration up to a certain point in time through specific second data (D20) to be presented.

With regard to data processing system (1) according to a fourth aspect, in any one of the first to third aspects, presentation part (47) presents specific second data (D20) in an aspect including first data (D1) generated by first generator (3A) at a certain point in time and prediction data related to first data (D1) in future after the certain point in time.

According to the above aspect, the user can confirm a status of progress of future deterioration predicted from a certain point of time through specific second data (D20) to be presented.

With regard to data processing system (1) according to a fifth aspect, in any one of the first to fourth aspects, presentation part (47) further presents at least one of pieces of second data (D2) other than specific second data (D20) among three or more pieces of second data (D2).

According to the above aspect, the user can visually confirm a status of progress of deterioration through specific second data (D20) displayed on the screen and other pieces of second data (D2).

With regard to data processing system (1) according to a sixth aspect, in any one of the first to fifth aspects, the specific processing includes processing related to non-presentation of object data (D10). Presentation part (47) stops screen display of object data (D10) by display device (81).

According to the above aspect, since the screen display of object data D10 having a high possibility of being generated by the influence of noise or the like is stopped, it is possible to prevent misleading from being caused in the deterioration diagnosis.

With regard to data processing system (1) according to a seventh aspect, in any one of the first to sixth aspects, the specific processing includes processing related to the correction of object data (D10). Presentation part (47) corrects object data (D10) based on at least one change tendency of pieces of second data (D2) other than specific second data (D20) among three or more pieces of second data (D2), and presents corrected object data (D10).

According to the above aspect, since object data (D10) having a high possibility of being generated due to the influence of noise or the like is corrected and presented, it is possible to more hardly cause misleading in the deterioration diagnosis.

With regard to data processing system (1) according to an eighth aspect, in any one of the first to seventh aspects, the specific processing includes processing related to the correction of object data (D10). Presentation part (47) corrects object data (D10) based on the past change tendency of object data (D10) in the specific second data (D20) and presents the corrected object data (D10).

According to the above aspect, the reliability regarding the correction of object data (D10) is improved.

With regard to data processing system (1) according to a ninth aspect, in the seventh or eighth aspect, in a case where specific second data (D20) is displayed on the screen from display device (81), presentation part (47) displays corrected object data (D10) on the screen in a display form distinguishable from other pieces of first data (D1).

According to the above aspect, the user can easily confirm visually that object data (D10) displayed on the screen is corrected data.

With regard to data processing system (1) according to a tenth aspect, in any one of the seventh to ninth aspects, presentation part (47) corrects object data (D10) with an approximate curve.

According to the above aspect, the reliability regarding the correction of object data (D10) is improved.

With regard to data processing system (1) according to an eleventh aspect, in any one of the first to tenth aspects, the specific processing includes processing of notification related to object data (D10). In a case where specific second data (D20) is displayed on the screen from display device (81), presentation part (47) displays warning information indicating that specific second data (D20) exhibits the change tendency different from the change tendencies of other pieces of second data (D2) on the screen.

According to the above aspect, the user can easily know that there is object data (D10) having a high possibility of being generated by the influence of noise or the like through the warning information displayed on the screen. Thus, it is possible to make it more difficult to cause misleading in the deterioration diagnosis.

Data processing system (1) according to a twelfth aspect further includes reliability determination part (44) in any one of the first to eleventh aspects. Reliability determination part (44) determines reliability related to the change tendency of specific second data (D20) based on a change tendency of reference data having a same type of a feature value as specific second data (D20). In a case where specific second data (D20) is displayed on a screen from display device (81), presentation part (47) displays information regarding the reliability on the screen.

According to the above aspect, the user can easily know how reliable specific second data (D20) is through the information on the reliability displayed on the screen. Thus, it is possible to make it more difficult to cause misleading in the deterioration diagnosis.

In any one of the first to twelfth aspects, data processing system (1) according to a thirteenth aspect further includes diagnosis part (46). Diagnosis part 46 determines a degree of deterioration of object OB1 regarding a corresponding feature value for each of three or more pieces of second data (D2). Presentation part (47) displays three or more pieces of second data (D2) on a screen from display device (81) in an aspect of being visually recognizable for the degree of deterioration determined by diagnosis part (46).

According to the above aspect, the user can easily know the degree of deterioration of object (OB1) through three or more pieces of second data (D2) displayed on the screen.

Data processing method according to a fourteenth aspect relates to deterioration diagnosis of object (OB1) of at least one of load (73) and servomotor (72) in servo system (7). Servo system (7) includes load (73), servo amplifier (71), and servomotor (72) that applies power to load (73) in accordance with control of servo amplifier (71). The data processing method includes an acquisition step, a first generation step, a second generation step, and a presentation step. In the acquisition step, at least one signal of the control signal used for controlling servo system (7) and the detection signal output from sensor (61) that detects the state of servo system (7) is acquired. In the first generation step, pieces of first data (D1) regarding three or more feature values are generated from a predetermined region in a signal waveform of at least one signal. In the second generation step, three or more pieces of second data (D2) that are pieces of time-series data indicating the progress of deterioration of object (OB1) and each indicate change tendencies with time of pieces of first data (D1) regarding three or more feature values are generated. In the presentation step, three or more pieces of second data (D2) are compared with each other. In the presentation step, in a case where there is specific second data (D20) exhibiting the change tendency different from another second data (D2), the specific processing related to object data (D10) that is first data (D1) that causes the different change tendency is performed to present specific second data (D20). The specific processing includes processing related to at least one of non-presentation of object data (D10), correction of object data (D10), and notification related to object data (D10).

According to the above aspect, it is possible to provide a data processing method that makes it difficult to cause misleading in the deterioration diagnosis.

A program according to a fifteenth aspect is a program for causing one or more processors to execute the data processing method in the fourteenth aspect.

According to the above aspect, it is possible to provide a function of making it difficult to cause misleading in the deterioration diagnosis.

The configurations according to the second to thirteenth aspects are not essential configurations for data processing system (1), and can be omitted as appropriate.

INDUSTRIAL APPLICABILITY

The present disclosure can improve the accuracy of the deterioration diagnosis by making it difficult to cause misleading in the deterioration diagnosis of the servo system, can improve the efficiency of maintenance and inspection of the facility, and is industrially useful.

REFERENCE MARKS IN THE DRAWINGS

1 data processing system
2 acquisition part
3A first generator
3B second generator
44 reliability determination part
46 diagnosis part
47 presentation part
61 sensor
7 servo system
71 servo amplifier
72 servomotor
73 load
81 display device
D1, D1X first data
D10 object data
D2 second data
D20 specific second data OB1 object
ti start point
tf end point

The invention claimed is:

1. A data processing method related to deterioration diagnosis of at least one of a load or a servomotor in a servo system, the servo system including the load, a servo amplifier, and the servomotor that applies power to the load in accordance with control of the servo amplifier, the data processing method comprising:

acquiring at least one signal of a control signal used for controlling the servo system or a detection signal output from a sensor that detects a state of the servo system;

generating pieces of first data regarding three or more feature values from a predetermined region in a signal waveform of the at least one signal;

generating three or more pieces of second data that are pieces of time-series data indicating progress of deterioration of at least one of the load or the servomotor, the three or more pieces of second data indicating change tendencies with time of the pieces of first data regarding the three or more feature values, respectively; and comparing the three or more pieces of second data with each other, and presenting specific second data exhibiting a change tendency different from the change tendencies of other pieces of second data by performing specific processing related to object data that is the first data that causes the different change tendency in a case where there is the specific second data, wherein the specific processing includes processing related to at least one of non-presentation of the object data, correction of the object data, or notification regarding the object data, and the presenting comprises presenting the specific second data in an aspect including the first data at a certain point in time and prediction data related to the first data in future after the certain point in time.

2. The data processing method according to claim 1, wherein the presenting the specific second data comprises presenting the specific second data by screen display from a display device.

3. The data processing method according to claim 1, wherein the data processing method further comprises presenting at least one of the pieces of second data other than the specific second data among the three or more pieces of second data.

4. The data processing method according to claim 1, wherein the specific processing includes processing related to the non-presentation of the object data, and the presenting the specific second data includes stopping screen display of the object data by a display device.

5. The data processing method according to claim 1, wherein the specific processing includes processing related to the correction of the object data, and the presenting the specific second data includes correcting the object data based on the change tendency in past before the object data in the specific second data, and presenting the corrected object data.

6. The data processing method according to claim 1, wherein the specific processing includes processing of notification related to the object data, and in a case where the specific second data is displayed on a screen from a display device, the data processing method further comprises displaying warning information indicating that the specific second data exhibits the change tendency different from the change tendencies of the other pieces of second data on a screen.

7. The data processing method according to claim 1, wherein the data processing method further comprises:

determining a degree of deterioration of an object regarding a corresponding feature value for each of the three or more pieces of second data, and displaying the three or more pieces of second data in an aspect of being visually recognizable for the degree of deterioration in the presenting the specific second data.

8. A data processing method related to deterioration diagnosis of at least one of a load or a servomotor in a servo system, the servo system including the load, a servo amplifier, and the servomotor that applies power to the load in accordance with control of the servo amplifier, the data processing method comprising:

acquiring at least one signal of a control signal used for controlling the servo system or a detection signal output from a sensor that detects a state of the servo system;

generating pieces of first data regarding three or more feature values from a predetermined region in a signal waveform of the at least one signal;

generating three or more pieces of second data that are pieces of time-series data indicating progress of deterioration of at least one of the load or the servomotor, the three or more pieces of second data indicating change tendencies with time of the pieces of first data regarding the three or more feature values, respectively; and comparing the three or more pieces of second data with each other, and presenting specific second data exhibiting a change tendency different from the change tendencies of other pieces of second data by performing specific processing related to object data that is the first data that causes the different change tendency in a case where there is the specific second data, wherein the specific processing comprises correction of the object data, with an approximate curve, based on the change tendency of at least one of the pieces of second data other than the specific second data among the three or more pieces of second data, and presenting the corrected object data.

9. The data processing method according to claim 8, wherein, in a case where the specific second data is displayed on a screen, the data processing method comprises displaying the corrected object data in a display form distinguishable from other pieces of first data on the screen in the presenting the specific second data.

10. A data processing method related to deterioration diagnosis of at least one of a load or a servomotor in a servo system, the servo system including the load, a servo amplifier, and the servomotor that applies power to the load in accordance with control of the servo amplifier, the data processing method comprising:

acquiring at least one signal of a control signal used for controlling the servo system or a detection signal output from a sensor that detects a state of the servo system;

generating pieces of first data regarding three or more feature values from a predetermined region in a signal waveform of the at least one signal;

generating three or more pieces of second data that are pieces of time-series data indicating progress of deterioration of at least one of the load or the servomotor, the three or more pieces of second data indicating change tendencies with time of the pieces of first data regarding the three or more feature values, respectively; and comparing the three or more pieces of second data with each other, and presenting specific second data exhibiting a change tendency different from the change tendencies of other pieces of second data by performing specific processing related to object data that is the first data that causes the different change tendency in a case where there is the specific second data, wherein the specific processing includes processing related to at least one of non-presentation of the object data, correction of the object data, or notification regarding the object data, the data processing method further comprises determining reliability related to the change tendency of the specific second data based on a change tendency of reference data having a same type of a feature value as the specific second data, in a case where the specific second data is displayed on a screen, the data processing method further comprises displaying information regarding the reliability on the screen.

* * * * *